United States Patent
Addy et al.

(10) Patent No.: US 7,324,549 B2
(45) Date of Patent: Jan. 29, 2008

(54) SYNCHRONISATION COMMUNICATION SYSTEMS

(75) Inventors: Tim Addy, Winchester (GB); Markku Vainikka, Kiviniemi (FI); Timo Viero, Espoo (FI); William Brockington, Paignton (GB); Markku Vähätaini, Maksniemi (FI)

(73) Assignee: Nokia Corporation, Espoo (FI)

( * ) Notice: Subject to any disclaimer, the term of this patent is extended or adjusted under 35 U.S.C. 154(b) by 869 days.

(21) Appl. No.: 10/378,653

(22) Filed: Mar. 5, 2003

(65) Prior Publication Data

US 2004/0042430 A1     Mar. 4, 2004

(30) Foreign Application Priority Data

Mar. 5, 2002   (GB) ................... 0205142.3

(51) Int. Cl.
    *H04J 3/16*   (2006.01)
    *H04J 3/22*   (2006.01)

(52) U.S. Cl. ........................ 370/465; 370/510

(58) Field of Classification Search ............... 370/350, 370/503, 509, 507, 508, 510, 511, 512, 513, 370/514; 375/354, 363, 365, 366
See application file for complete search history.

(56) References Cited

U.S. PATENT DOCUMENTS 5,577,047 A * 11/1996 Persson et al. ............. 370/333
6,041,047 A *  3/2000 Diachina et al. ............ 370/347
6,147,963 A   11/2000 Walker et al.
6,212,176 B1 *  4/2001 Andersson et al. ......... 370/347
6,252,868 B1 *  6/2001 Diachina et al. ............ 370/347
2007/0058593 A1 *  3/2007 Ushirokawa et al. ....... 370/335

FOREIGN PATENT DOCUMENTS

| CN | 1192836 | 9/1998 |
| CN | 1306358 | 8/2001 |
| EP | 0 656 704 A1 | 6/1995 |
| FR | 2805694 | 8/2001 |
| WO | WO 96/42158 | 12/1996 |
| WO | WO 01/89188 A1 | 11/2001 |

\* cited by examiner

*Primary Examiner*—Ajit Patel
(74) *Attorney, Agent, or Firm*—Squire, Sanders & Dempsey, LLP.

(57) ABSTRACT

A method and apparatus of transmitting data at a line rate to a bus operating at a bus rate includes transmitting the data in a packet format having a plurality of frames each having a plurality of time slots. Each time slot has successive message groups, and each message group includes a plurality of data messages containing the data and an idle code containing none of the data. A number of idle codes in each frame is selected such that the bus rate matches the line rate. Various communication buses, and methods of synchronizing data are implemented.

16 Claims, 6 Drawing Sheets

SYNCHRONISATION COMMUNICATION SYSTEMS

REFERENCE TO RELATED APPLICATIONS

This application claims priority of British Patent Application Serial No. 0205142.3 filed Mar. 5, 2002 in Great Britain. The subject matter of this earlier filed application is hereby incorporated by reference.

BACKGROUND OF THE INVENTION

1. Field of the Invention

The present invention is concerned with synchronisation of baseband communications in a wireless communications network.

2. Description of the Related Art

Within a base transceiver station of a wireless communications network, a bus protocol is used to communicate between different nodes. The present invention is concerned particularly but not exclusively with communication between baseband (BB) and radio frequency (RF) nodes in the base transceiver station. Nodes are implemented in a plurality of different ways, and in the following description it is understood that the term "node" implies any appropriate hardware unit, for example an ASIC, processor or FPGA, etc.

The bus protocol used between the different nodes of the base transceiver station is used to transfer digitised transmitter (TX) and receiver (RX) samples as well as other information.

The present invention addresses the problem of synchronising a bus, in particular a high speed bus operating a bus protocol used for communication between different nodes in a base transceiver station.

It is a further aim of the present invention is to provide a frame format used in conjunction with synchronisation methods for synchronising communications on a multi-mode communications bus, which does not require complex circuitry.

SUMMARY OF THE INVENTION

In general terms, the invention relates to bus synchronisation using idle codes, with the possibility of detecting 8b10b decoding status. In the described embodiment initial synchronisation and synchronisation at run time is discussed. The position in a frame and value of the idle code is utilised.

According to one aspect of the present invention there is a provided a method of transmitting data at a line rate from a wireless interface to a bus operating at a bus rate, the method comprising transmitting the data in a packet format consisting of a plurality of frames each having a plurality of time slots, each time slot having successive message groups, wherein each message group comprises a plurality of data messages containing said data and an idle code containing no said data; wherein the number of idle codes in each frame is selected so that the bus rate matches the line rate.

According to a further aspect of the present invention there is provided a method of transmitting data at a line rate from a wireless interface to a bus operating at a bus rate, the method comprising transmitting the data in a packet format consisting of a plurality of frames each having a plurality of time slots, each time slot having successive message groups, wherein each message group comprises a plurality of data messages containing said data and an idle code containing no said data; wherein the number of idle codes in each frame is selected so that the bus rate matches the line rate.

According to yet another aspect of the present invention there is provided a communication bus operable at a bus rate and having at least a first node and a second node that are linked by communication channels for transmitting at said bus rate data generated at a line rate, said first node having a transmitting element and said second node having a receiving element, wherein the transmitting element of said first node is operable to transmit data in a packet format consisting of a plurality of frames each having a plurality of time slots, each time slot having successive message groups, wherein each message group comprises a plurality of data messages containing said data and an idle code containing no said data; wherein said number of idle codes in each frame is selected so that the bus rate matches the line rate and wherein the receiving element of the second node is arranged to detect said idle codes for synchronisation purposes.

According to a still further aspect there is provided a method of synchronising a data communication over a bus in a packet format, said data having been generated at a line rate over a wireless interface consisting of a plurality of frames each having a plurality of time slots, each time slot having successive message groups, wherein each message group comprises a predetermined number of data messages containing said data and an idle code containing no said data, the method comprising detecting at a bus node said idle codes until a predetermined number of said idle codes have been detected indicating successful synchronisation.

According to a still further aspect there is provided a method of synchronising data communication via a bus connecting first and second nodes comprising: transmitting from the first node a plurality of bytes, each byte representing a 10 bit sequence as an 8 bit code; receiving and decoding said bytes at the second node, whereby any 8b10b encoding errors in a byte are detected; and indicating a synchronised status for the bus based on the detection of received bytes which do not contain 8b10b decoding errors.

According to a still further aspect there is provided a method of synchronising data communication via a bus connecting first and second nodes comprising: transmitting from the first node a plurality of bytes, each byte representing a 10 bit sequence as an 8 bit code; receiving and decoding said bytes at the second node, whereby any 8b10b encoding errors in a byte are detected; and indicating an unsynchronised status for the bus based on the detection of received bytes containing 8b10b decoding errors.

For a better understanding of the present invention and to show how the same may be carried into effect, reference will now be made by way of example to the accompanying drawings in which:

DETAILED DESCRIPTION OF THE PREFERRED EMBODIMENTS

Figure 1:
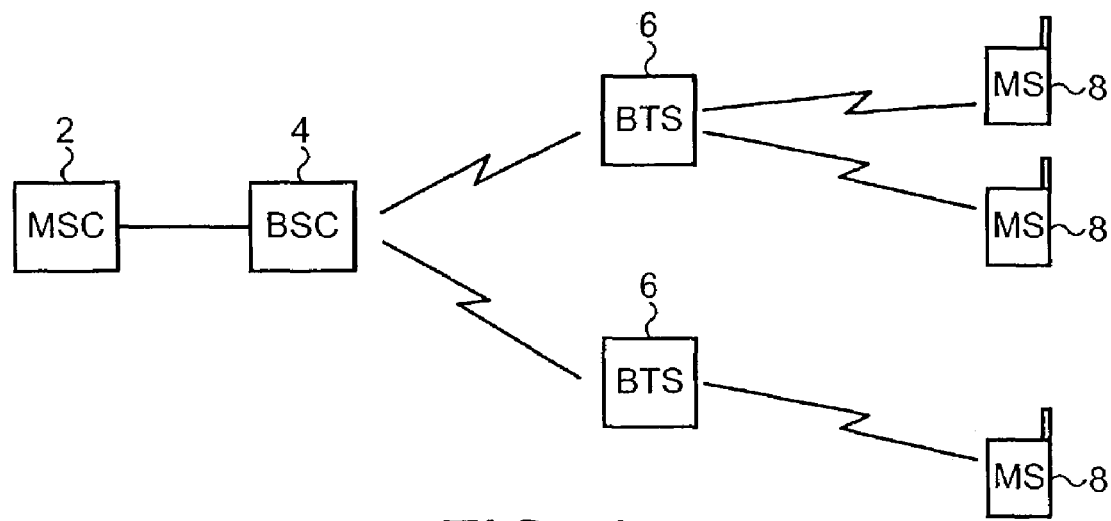
FIG. 1 shows the basic structure of a wireless communications network.

FIG. 1 shows the traditional elements of a wireless communications network. A Mobile Switching Center (MSC) 2 acts as an interface with other networks, for example the Public Switched Telephone Network (PSTN). The MSC 2 controls a plurality of Base Station Controller's (BSC) 4, where each BSC 4 in turn controls plurality of Base Transceiver Stations (BTS) 6. Each BTS 6 has a certain coverage area known as a "cell", which is used to communicate with mobile stations in their respective coverage areas.

Figure 2:
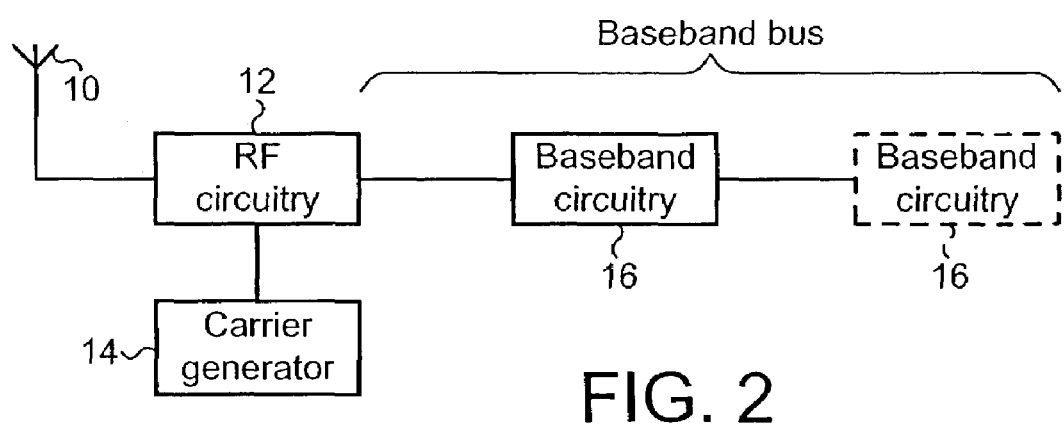
FIG. 2 shows the context of the present invention for use at baseband frequencies.

FIG. 2 shows the typical components of a transceiver used in wireless networks where radio signals are transmitted and received using antennae 10. These radio signals are transferred at a carrier frequency determined by a carrier generator 14. Spectrum allocations are licensed and will vary depending on the country involved and the type of air interface being used, for example WCDMA, GSM, etc. In a typical transceiver, for example as would be found at each of the BTS's 6 of FIG. 1, there is a baseband circuitry 16 concerned with the processing of baseband signals. These baseband signals are then converted into a carrier signal by RF circuitry 12 for transmission by the antennae 10. The embodiments of the present invention discussed herein are in the context of the baseband circuitry 16, where a bus protocol connects BB and RF nodes together.

Figure 3:
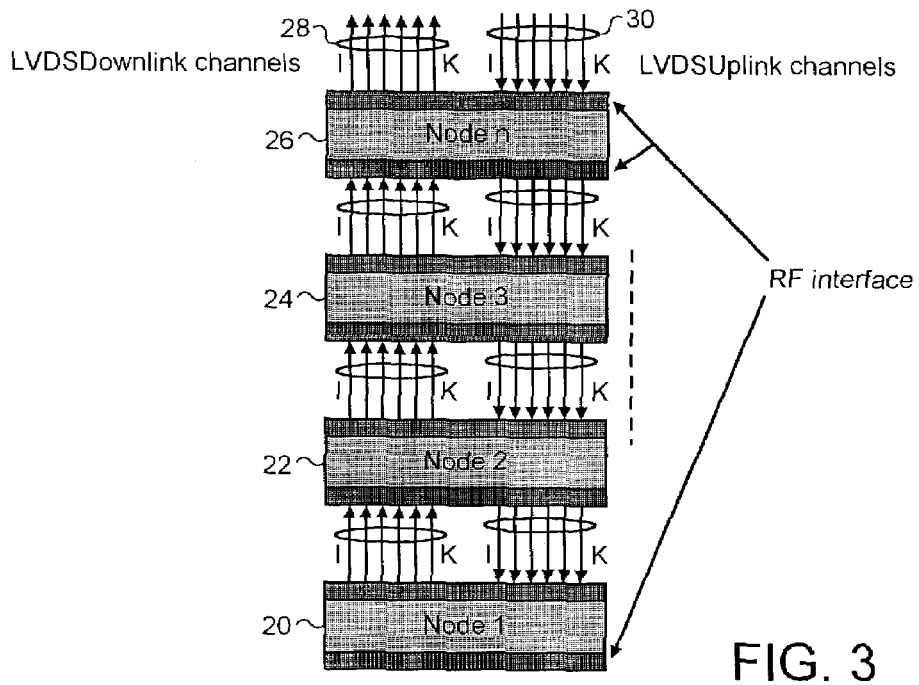
FIG. 3 shows an embodiment of the architecture of the physical baseband bus of the present invention.

FIG. 3 shows the physical architecture of the baseband bus where nodes 20, 22, 24, 26 are chained in a point-to-point manner according to a first embodiment of the present invention. Each of the nodes can be implemented by using an Application Specific Integrated Circuit (ASIC). The nodes communicate using a first set of communication channels 28 in an Uplink direction and over a second set of communication channels in the opposite or Downlink direction 30. Each of the nodes are shown as having a plurality of communication channels referred to herein as links, i.e. 1 to k, in either direction. Some of the nodes may have an RF interface. Other nodes are baseband nodes with no RF interface.

Packetised data may be sent over the baseband bus. As can be seen from FIG. 3 the bus is implemented using a plurality of links. A single link is however possible. In a preferred embodiment the baseband bus consists of point-to-point connections forming a chained bus. In this embodiment, the point-to-point connections are achieved using Low Voltage Differential Signalling (LVDS).

Figure 4:
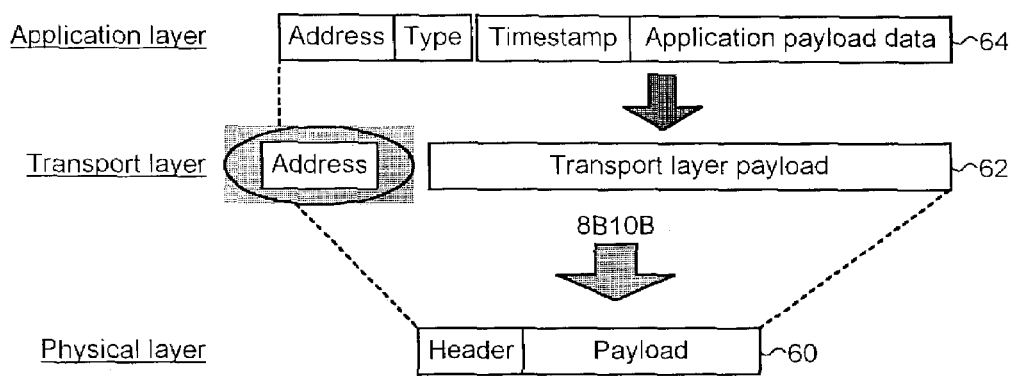
FIG. 4 shows the baseband bus protocol stack according to an embodiment of the present invention.

The baseband bus uses a three-layer protocol with fixed length messages. Any information to be sent over the baseband bus is packed into messages of known type. The three layers are shown in FIG. 4. The physical layer 60 is responsible for the transmission of messages and includes framing, coding and serialisation of the messages. The transport layer 62 is responsible for the end-to-end delivery of the messages or routing of the messages. The application layer 64 provides the mapping of different types of packets to the payload.

In CDMA applications, data at the application layer is continuous, but for transfer over the bus, the continuous data of the application layer is time sliced into short messages that are transferred over the high-speed physical layer. At the receiving node a continuous stream is recovered.

Figure 5:
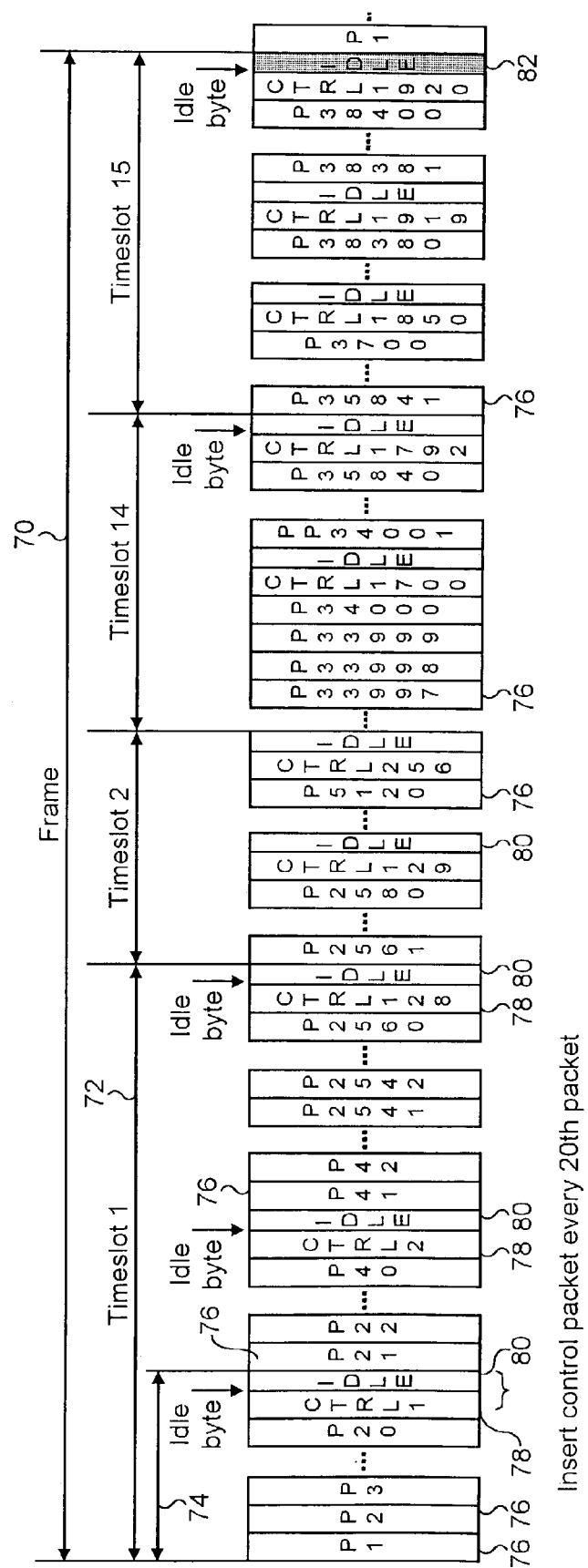
FIG. 5 shows a frame format according to an embodiment of the present invention.

FIG. 5 shows a frame 70 of the physical layer with a certain packet format being sent over the bus in both the uplink and downlink directions. The frame has a fixed 10 ms period. Frames are inserted consecutively onto the bus. A frame is split into fifteen timeslots 72 where each timeslot contains a plurality of message groups 74. Each message group 74 has a fixed predetermined number of data messages 76, one control message 78 and an IDLE message 80.

Figure 6:
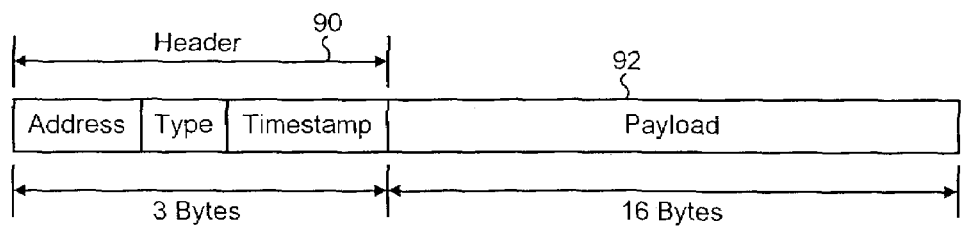
FIG. 6 shows an embodiment of the message structure of the present invention.

A preferred embodiment of the message structure 76 is shown in FIG. 6. These messages are transmitted over the physical layer 60 shown in FIG. 4. In this embodiment, the messages are of a fixed length of 19 bytes having a header portion 90 of 3 bytes and a payload portion 92 of 16 bytes. Thus, all messages including control and data have the same message definition. For one embodiment as will be described hereafter, the idle message is in the form of an idle byte.

When there is no data message to transmit, that is, no message has been received from the transport layer for a given time slot, then the physical layer 60 transmits an empty message, which can be implemented by transmitting "1" bits for the entire message. The physical layer at the receiving node will detect the existence of an empty message and rejects such messages, thereby making these messages invisible to the upper protocol layers 62,64.

In the embodiment shown in FIG. 5, the message group 74 comprises one control message 78 inserted after every twenty data messages 76 and an IDLE byte 80 inserted after the control message 78. The same IDLE byte 80 is used at the end of each message group 74 with the exception that a special IDLE byte 82 is used in the final timeslot to identify the end of the frame. The significance of the special IDLE byte 82 will be discussed later.

In the present embodiment, the bus speed is chosen to be 768 Mbps. A derivative of the BTS reference system clock is used as a clock for the baseband bus and the physical layer 60 of the bus protocol is synchronised to the BTS system clock. However, application layers of the bus protocol can operate asynchronously with respect to the timing of the physical layer, which is especially useful for GSM or EDGE application where data is not continuous but instead is transmitted in bursts and is inherently asynchronous.

For the present embodiment, consider the situation of a WCDMA uplink. Consider a signal described in terms of its in-phase component (I) and its quadrature component (Q) where the I and Q values are each 8 bits.

At a sample rate of 7.68 Msps (Mega samples per second), this gives a payload rate of 7.68M*(8*2)=122.88 Mbps (Mega bits per second). Since the packet has a 3 byte header and 16 byte payload, the packet rate is 122.88*(19/16) =145.92 Mbps. After an 8b10 coding scheme is used, the line rate is 145.92M*(10/8)=182.4 Mbps.

FIG. 3 shows a plurality, i.e. 1 to k links being used to communicate in either direction. Each link supports four paths so that each uplink, of the group of uplinks 28, is required to support four uplink paths, giving a line rate of 182.4M*4=729.6 Mbps per link. If control messages are inserted every twentieth packet, this gives a line rate of 729.6*(21/20)=766.08 Mbps.

However, a bus speed of 768 Mbps has been chosen. Therefore an extra 768−766.08=1.92 Mbps is needed in order to match the line rate to the bus speed. To achieve this, taking into account the 8b10b coding, 1.92M *(8/10)=1.536 Mbps of "plain" data needs to be inserted, which is 1.536 Mbps/8=192000 "plain" bytes per second. Each frame has a time period of 10 ms, therefore 192000/100=1920 IDLE bytes per frame are inserted. Each frame has 15 time slots resulting in 1920/15=128 IDLE bytes per time slot. There are 2560 data messages per time slot, which means 128/2560=1 byte per 20 messages should be an IDLE byte in order to match the line rate to the bus speed.

Therefore, by insertion of IDLE bytes it becomes possible to match the line rate to be an integer multiple of the system clock rate and alleviates the need for additional complex circuitry needed to account for a mismatch between the line rate and the bus speed.

Figure 7:
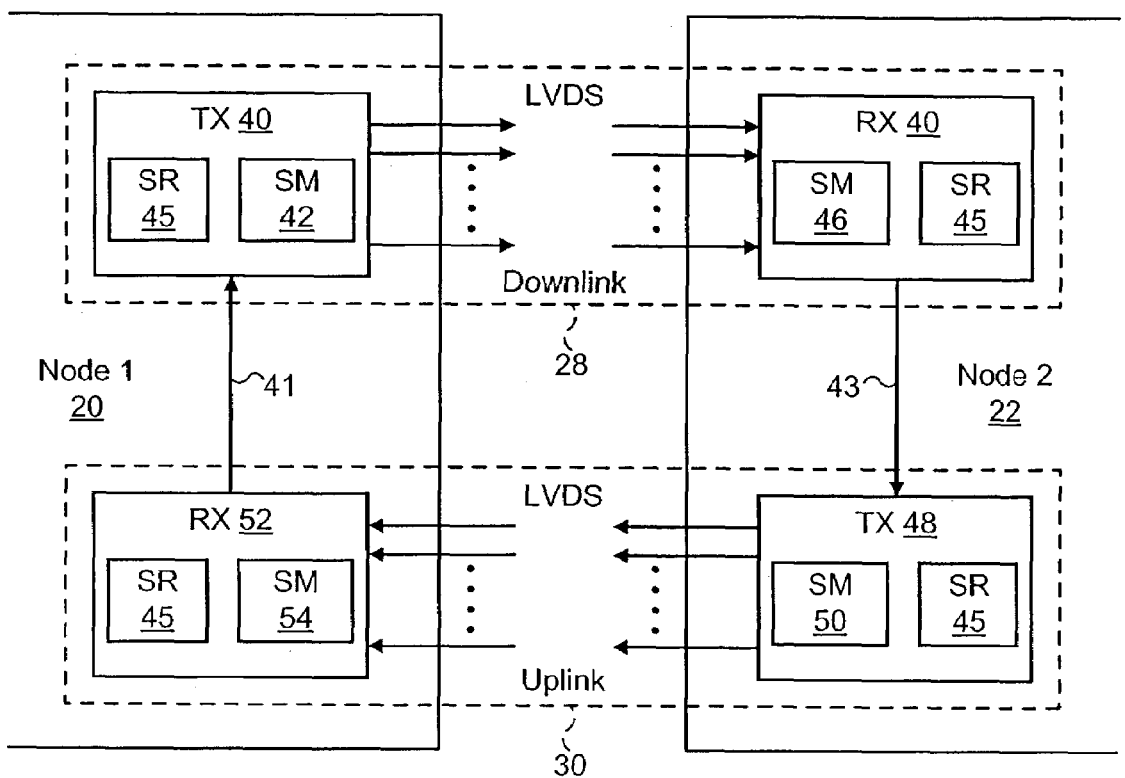
FIG. 7 shows two communicating nodes of the baseband bus.

FIG. 7 shows the LVDS point-to-point connections in an uplink direction 30 and a downlink direction 28 between a first node 20 and a second node 22 of the bus. Each LVDS point-to-point connection corresponds to each of the 1 to k links shown in the uplink 28 or downlink directions 30 of FIG. 3. Each node 20, 22 comprises a transmission element 40, 48 and a receiving element 44, 52. In the downlink case, a transmission element 40 transmits information from a first node 20 to a receiving element 44 in a second node 22 using LVDS connections. In the uplink direction, a transmitting element 48 transmits information from a second node 22 to the receiving element 52 of a first node 20. A communication channel 41 exists between the transmitter 40 and receiver 52 of the first node 20. Also, a communication channel 43 exists between receiver 44 and transmitter 48 of the second node 22. These communication channels may be used by receivers on a node to inform the transmitters if a loss of synchronisation occurs.

Figure 8:
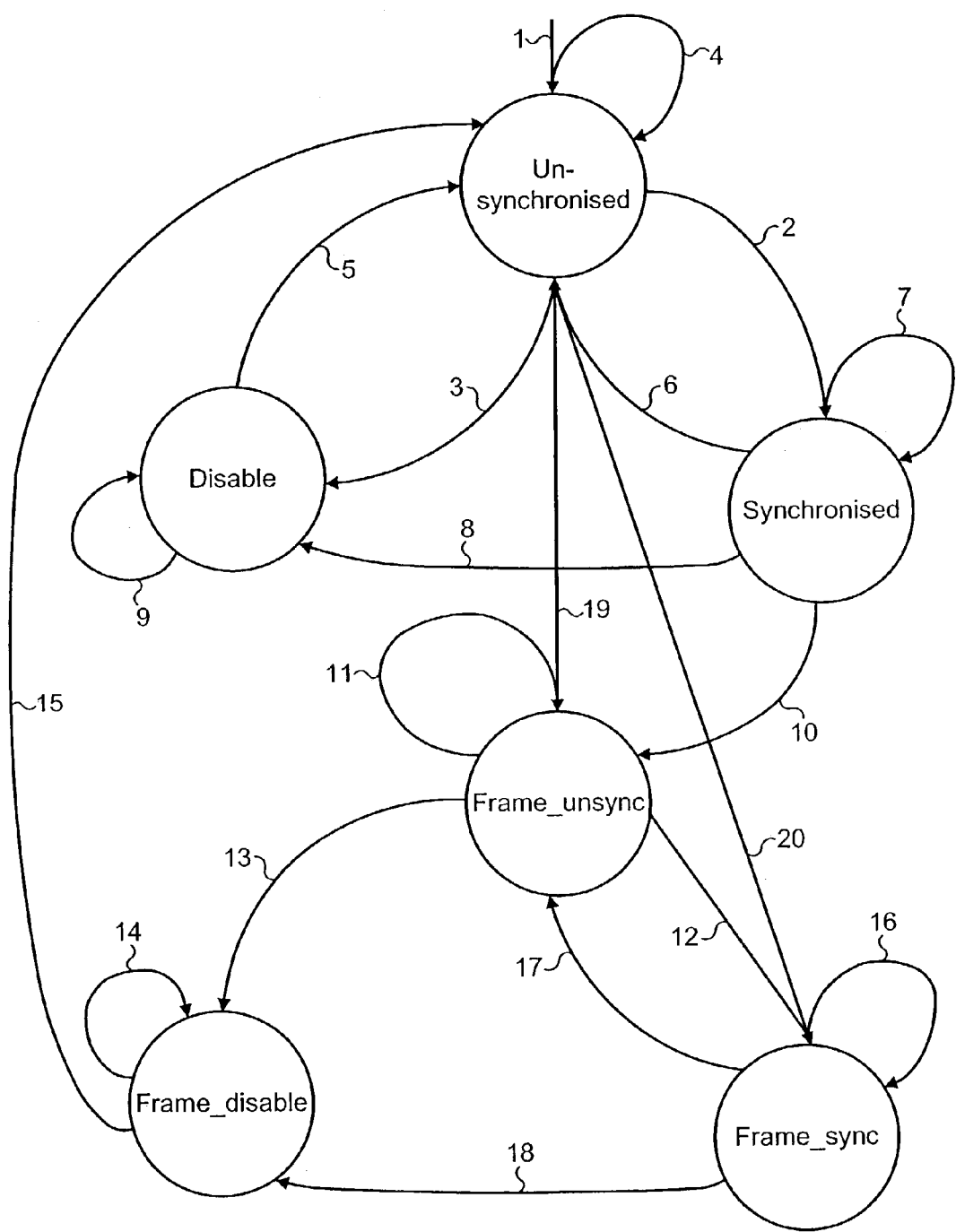
FIG. 8 shows a state transition diagram of the logic implemented within the receiving elements of each baseband node.
Figure 9:
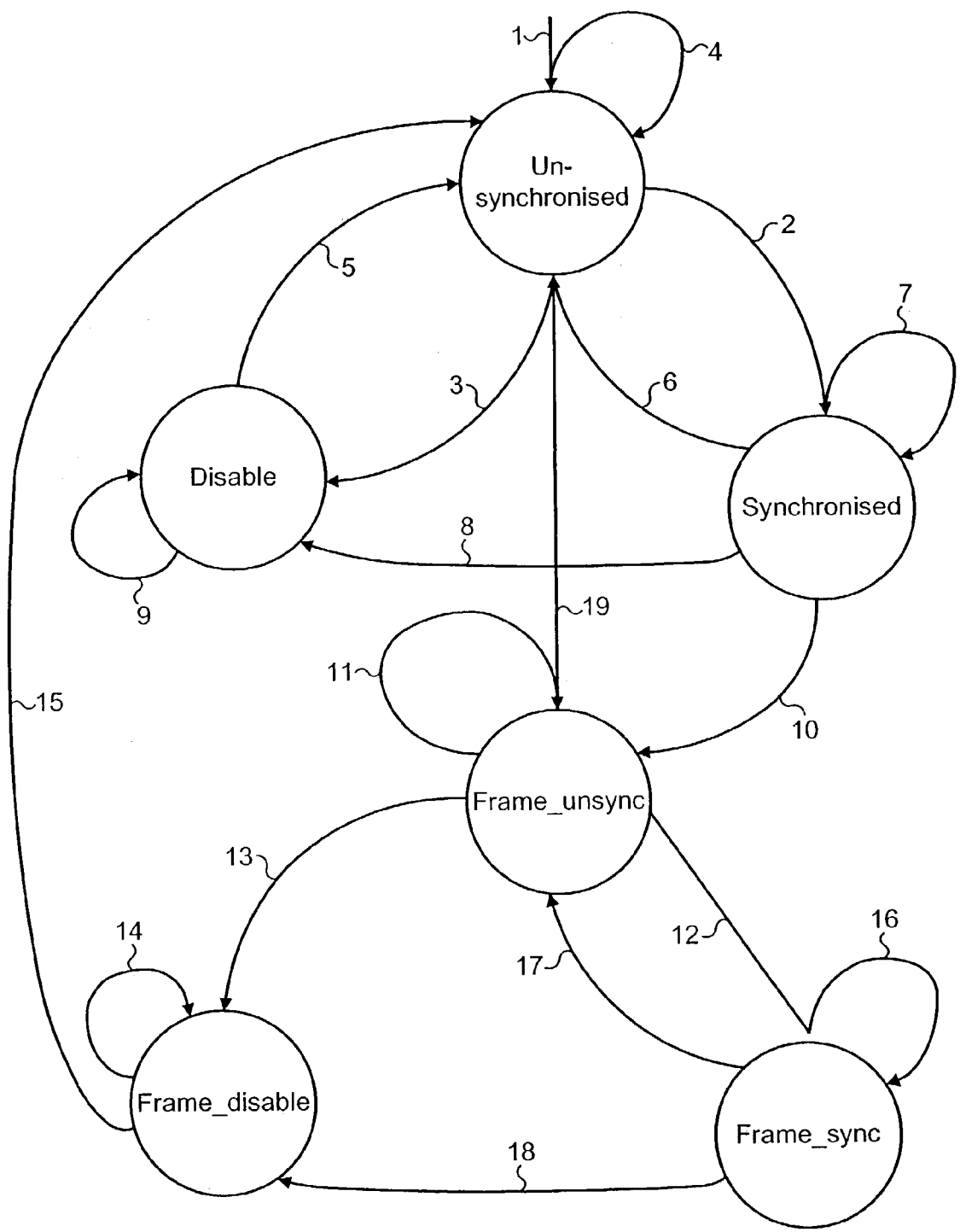
FIG. 9 shows a state transition diagram of the logic implemented within the transmitting elements of each baseband node.

It can also been seen that each of the transmitting 40, 48 and receiving elements 44, 52 have their own respective state machine logic 42, 46, 50, 54. FIG. 8 is a state transition diagram showing the state machine logic 46, 54 of the receiving elements 44, 52. FIG. 9 is a state transition diagram showing the state machine logic 42, 50 of the transmitting elements 40, 48. Tables 1, 2 and 3 given below can be used to interpret these state transition diagrams.

Table 1 below provides a definition of the signals used in the state machine for synchronisation.

TABLE 1

| Signal | Definition | Active state |
| --- | --- | --- |
| NdFifoValid | Node clock domain Fifo valid signal to indicate that the fifo is passing valid bytes to the rx decoder | Active high = '1', default = '0' |
| FRAME_IDLE_VALID | Frame IDLE byte (K28.7) is received to indicate that a new frame boundary is present. | Active high = '1' for a single cycle when a K28.7 IDLE byte is received. Default = '0' |
| SET_RUN_TIME_MODE | Value '1' enables run time mode, '0' disables run time mode. Messages are transferred over the bus in run-time mode. | Active high = '1', default = '0' |
| ENABLE_BUS_TRANSCEIVER | The bus transceiver is enabled by value '1'. This enables the transmitter to start sending IDLE. | Active high = '1', default = '0' |
| RESTART_FROM_DISABLE | This signal resets the state machine when the state is either DISABLE or FRAME_DISABLE. | Single cycle Active high pulse = '1', default = '0' |

Figure 10A:
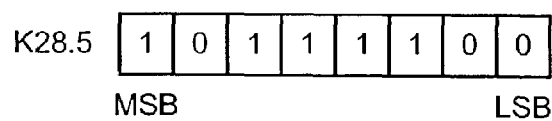
FIGS. 10a and 10b show the bit patterns for the idle codes according to an embodiment of the present invention.
Figure 10B:
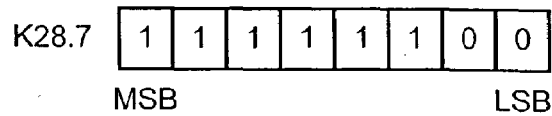

It should be noted that the IDLE code 80 inserted at the end of each message group 74 is referred to herein as the "K28.5" IDLE byte, whereas the special IDLE code 82 inserted at the end of each frame 70 is referred to herein "K28.7" IDLE byte. FIG. 10*a* and FIG. 10*b* show the bit patterns that make up the K28.5 and K28.7 idle bytes respectively, in the 8 bit domain. These bit patterns are known as so-called "comma characters", which are uniquely chosen to indicate possible errors.

These codes (and other data bytes) are transmitted as 10 bits using an 8b10b encoding scheme, for example as described in "A DC-Balanced, Partitioned-Block, 8B/10B Transmission Code", by Widmer and Franaszek, IBM J. Res. Develop. Vol. 27 No. 5, September 1983. The transmitter has means for encoding the 8b bytes into 10b codes and the receiver has means for decoding the codes and for error checking.

Table 2 below defines the state transitions and triggers required for these transitions for the state machine logic 46, 54 of the receiving elements 44, 52.

TABLE 2

| Transition | Trigger | Comment |
|---|---|---|
| 1 | ENABLE_BUS_TRANSRECEIVER='1' (values changes from '0' to '1') | Message Group counter reset. |
| 2 | SYNC_T valid Message Groups received | SYNC_T message groups of valid IDLE bytes have been received |
| 3 | DISABLE_T Message Groups or ENABLE_BUS_TRANSCEIVER='0' | Timeout counter has been reached without SYNC_T valid Message Groups being received or Application layer forces the state to DISABLE. |
| 4 | Not (2 or 3) | < SYNC_T valid Message Groups have been received and timeout count has not been reached |
| 5 | RESTART_FROM_DISABLE = '1' | Application layer has acknowledged that the state machine is in the DISABLE state and restarts the synchronization process |
| 6 | UNSYNC_T consecutive invalid Message Groups received | Synchronization lost due to UNSYNC_T consecutive invalid Message Groups received |
| 7 | Not (6 or 8 or 10) | Physical layer synchronization is maintained and valid IDLE bytes are being received. |
| 8 | ENABLE_BUS_TRANSCEIVER = '0' | The transceiver is DISABLED. This transition is forced by Application layer. |
| 9 | RESTART_FROM_DISABLE = '0' | Wait in the DISABLE for the Application layer to generate a RESTART_FROM_DISABLE signal. |
| 10 | SET_RUN_TIME_MODE = '1' & FRAME_IDLE_VALID | Run time mode has been activated and a K28.7 frame boundary IDLE byte received to indicate the start of empty messages. |
| 11 | Not (12 or 13) | Stay in the Frame_UNSYNC state |
| 12 | FRAME_SYNC_T consecutive valid message groups are received | |
| 13 | FRAME_DISABLE_T invalid message groups are received or ENABLE_BUS_TRANSCEIVER = '0' or SET_RUN_TIME = '0' | Transition to the FRAME_DISABLE state as FRAME_DISABLE_T invalid message groups have been received or Application layer halts the transceiver. |
| 14 | Not 15 | Wait for a RESTART_FROM_DISABLE signal. |
| 15 | RESTART_FROM_DISABLE = '1' | The state machine has been reset by Application layer (i.e. restart the initialisation process). |
| 16 | Not (17 or 18) | Valid Message Groups are being received. Normal message reception state. |
| 17 | FRAME_UNSYNC_T consecutive invalid message groups are received | Whilst in the FRAME_SYNC state, FRAME_UNSYNC_T consecutive invalid message groups are received. |

TABLE 2-continued

| Transition | Trigger | Comment |
|---|---|---|
| 18 | ENABLE_BUS_TRANSCEIVER = 0 or SET_RUN_TIME='0' | Transceiver DISABLE |
| 20 | GO_TO_FRAME_SYNC =1 & SET_RUN_TIME_MODE=1 & FRAME_IDLE_VALID | For test purposes: Run time mode has been activated and a K28.7 frame boundary IDLE byte received to indicate the start of the empty packet bytes. |
| 19 | SET_RUN_TIME_MODE = '1' & FRAME_IDLE_VALID | When in UNSYNCHRONIZED state, run time mode has been activated and a K28.7 frame boundary IDLE byte received to indicate the start of empty messages. |

Table 3 below defines the state transitions and triggers required for these transitions for the state machine logic 42, 50 of the transmitting elements 40, 48.

TABLE 3

| Transition | Trigger | Comment |
|---|---|---|
| 1 | ENABLE_BUS_TRANSCEIVER='1' (values changes from '0' to '1') | LOS in receiver is initially "1" |
| 2 | LOS = '0' | Receiver has acknowledged that SYNC_T IDLE bytes have been received. Receiver has acknowledged the transition to SYNCHRONISED state by changing LOS to "0" |
| 3 | ENABLE_BUS_TRANSCEIVER = '0' | Transmitter has been DISABLE. |
| 4 | ENABLE_BUS_TRANSCEIVER = '0' and LOS = '1' | Wait for Receiver to acknowledge receipt of SYNC_T IDLEs or transmitter DISABLE. |
| 19 | GO TO FRAME SYNC = '1' | Go to Frame UNSYNC state |
| 5 | RESTART FROM DISABLE = '1' | Transmitter has been reset and can transition to UNSYNCHRONISED and start sending IDLE. |
| 6 | LOS = '1' | Receiver has generated a Loss Of Signal. |
| 7 | LOS = '0' AND ENABLE BUS TRANSCEIVER = '1' and SET RUN-TIME MODE = '0' | Send IDLE bytes (with K28.7 at Frame boundary). |
| 8 | ENABLE BUS TRANCEIVER = '0' | Transition to the DISABLE state. |
| 9 | RESTART FROM DISABLE = '0' | Stay in Disable state |
| 10 | SET RUN-TIME MODE = '1' and FClk = '1' | Transition to the FRAME_UNSYNC when the transmitter has sent a K28.7 (last byte in the frame. |
| 11 | LOS = '1' AND (ENABLE BUS TRANCEIVER) = '1' OR SET RUN-TIME MODE = '1') | Stay in Frame_Unsync state |
| 12 | LOS = '0' | Receiver has acknowledged that it has received FrameUnsyncT valid Message Groups. |
| 13 | ENABLE BUS TRANSCEIVER = '0' | Go to FrameDisable state as the Transmitter has been DISABLE. |
| 14 | RESTART FROM DISABLE = '0' | Stay in Disable state. |
| 15 | RESTART FROM DISABLE = '1' | Restart the transmitter go to the UNSYNCHRONISED state. |
| 16 | LOS = '0' AND ENABLE BUS TRANSCEIVER = '1' AND SET TUN-TIME MODE ='1' | Stay in Frame_Sync state. |

TABLE 3-continued

| Transition | Trigger | Comment |
|---|---|---|
| 17 | LOS = '1' | Receiver has de-asserted the Loss Of Signal input so the transmitter must send empty messages. |
| 18 | ENABLE BUS TRANSCEIVER = '0' OR SET RUN-TIME MODE = '0' | Disable Transmitter |

Broadly speaking, there are two synchronisation algorithms which are applied, i.e. initial synchronisation and frame synchronisation. Initial synchronisation allows an initial check on the link quality of the bus, whereas frame synchronisation allows continuous monitoring of the link quality when the bus is in run time mode. The synchronisation algorithms can report link status information of the bus to upper layers of the protocol stack.

Initial synchronisation is performed when a bus node is booting up. The purpose of the initial synchronisation is to determine the status of each bus interface. That is, checking the status of a node's transmitting and receiving elements. Synchronisation may be unsuccessful due to a missing neighbouring node or a failure of the link.

In the present embodiment, the sequence of steps for initial synchronisation is the following:

Set state to UNSYNCHRONIZED.

Reset the message group counter to zero.

Start transmitting a constant stream of IDLE bytes from the transmitting element of any node, e.g. 20.

Start reading the IDLE bytes at the receiving element of any node, e.g. 22.

A message group is considered to be valid when all the IDLE bytes are properly received and there are no 8b10b decoding errors. Otherwise, a message group is considered to be invalid. It should be appreciated that there are (21 messages*19 bytes per message)+1 IDLE byte=400 bytes in a message group.

When in the state UNSYNCHRONIZED and a value of SYNC_T consecutive valid message groups have been received, the state of the state machine then is set to the SYNCHRONISED state.

When in the state SYNCHRONIZED and a value of UNSYNC_T consecutive invalid message groups have been received, the state of the state machine then is set to the UNSYNCHRONISED state. Also, the message group counter is set to zero.

When in the state UNSYNCHRONIZED and a value of DISABLE_T message groups have been received, the state of the state machine then is set to the DISABLE state. The value of DISABLE_T is larger or equal to the value of UNSYNC_T. When either of the transmitting or receiving elements of a node enter the DISABLE state, the application layer 64 is informed by an interrupt which then can restart the synchronization procedure.

The above synchronization algorithm can be generalized by considering validity of consecutive received bytes instead of message groups. Furthermore, synchronization can be based on any transmitted data and the success or failure of 8b10b decoding; not just transmission and reception of IDLE bytes.

The physical layer 60 contains a status register 45 for each transmitting and receiving element of each node of the bus indicating the synchronisation status. For example, DISABLE (000001), UNSYNCHRONISED (000010), SYNCHRONISED (000100). Other state encodings may be used. Regarding the operation of the transmitter during initial synchronization, IDLE bytes are sent in UNSYNCHRONIZED and SYNCHRONIZED states. Note that during initial synchronisation, only IDLE bytes are transmitted to the bus. This is not the case in run-time operation when data is transferred over the bus.

After the physical layer 60 has been configured into a run-time mode by the application layer (parameter SET_RUN-TIME_MODE is set equal to 1), frame synchronisation can be performed. In run-time mode, messages (e.g. data, control or even empty) are transferred over the bus. In run-time mode, receiver synchronization of a transceiver is started immediately. When the value of parameter SET_RUN-TIME_MODE is changed from 1 to 0, state of the transceiver is changed to FRAME_DISABLE.

In frame synchronisation, each transmitting element 40, 48 synchronises the frame timing with the baseband bus frame clock. Furthermore, the status of the frame synchronisation in each receiving element 44, 52 is constantly monitored. The end of each frame is identified from the unique IDLE byte K28.7. This unique IDLE byte allows one to calculate the received frame offset as well as monitoring of frame synchronization status.

In the present embodiment, frame synchronisation is applied to all the transmitting and receiving elements of the bus nodes when entering the run time mode and the sequence of steps for frame synchronisation is the following:

Set the state of the state machine to FRAME_UNSYNCHRONIZED.

Reset the message group counter to zero.

Start transmitting empty or other valid messages from the transmitting element 40, 48.

With reference to the baseband bus frame clock, read the IDLE byte of each message group from the received byte stream using the receiving element 44, 52. The IDLE byte must be the last byte of the message group and any other IDLE bytes are considered to be errors.

When the IDLE byte of a message group has been properly received and no 8b10b decoding errors are present, consider that message group to be valid. Otherwise, the received message group is invalid.

When in the state FRAME_UNSYNCHRONIZED and FRAME_SYNC_T consecutive valid message groups have been received, set the state to FRAME_SYNCHRONISED.

When in the state FRAME_SYNCHRONIZED and FRAME_UNSYNC_T consecutive invalid Message Groups have been received, set the state to FRAME_UNSYNCHRONISED and reset the message group counter to zero.

When in the state FRAME_UNSYNCHRONIZED and FRAME_DISABLE_T message groups have been received, set the state to FRAME_DISABLE.

The value of FRAME_DISABLE_T is always larger or equal to the value of FRAME_UNSYNC_T The status register 45 maintains an indication of the status of the frame where the status FRAME_DISABLE, FRAME_UNSYNCHRONIZED, and FRAME_SYNCHRONIZED correspond to the states 001000, 010000, and 100000 respectively. Other state encodings may also be used. When the transmitting or receiving elements enter the FRAME_DISABLE state, the application layer is informed by an interrupt, which can then restart the synchronization procedure. Regarding the operation of the transmitting elements during frame synchronization, valid messages are sent in the FRAME_SYNCHRONIZED state, whereas empty messages are sent in the FRAME_UNSYNCHRONIZED and FRAME-DISABLE states.

The synchronisation operation is now described for each respective state.

UNSYNCHRONISED

Restart the message group counter.
The transmitting element starts sending IDLE bytes.
The LOS is set to '1'.
The receiving element waits to receive data.
Valid bytes are beginning to be passed.
Initial byte synchronization is performed using the consecutive K28.5 idle code
The receiving element will start counting valid message groups. If SYNC_T consecutive valid message groups are received, then the state machine transitions to the SYNCHRONIZED state.
If DISABLE_T message groups are received (with 400 bytes in each), then the state machine transitions to the DISABLE state and the Receiver and Transmitters are disabled.
If ENABLE_BUS_TRANSCEIVER=0 is received, then the state machine transitions to the DISABLE state.
If SET_RUN_TIME_MODE=1, then the state machine transitions to the FRAME_UNSYNCHRONISED state.

SYNCHRONISED

Reset the message group counter.
Set the LOS to '0'
If UNSYNC_T consecutive invalid message groups are received, then the state machine transitions to the UNSYNCHRONISED state.
If SET_RUN_TIME_MODE=1, then the state machine transitions to the FRAME_UNSYNCHRONISED state.
If ENABLE_BUS_TRANSCEIVER=0, then the state machine transitions to the DISABLE state.

DISABLE

Stop all counters.
Set the LOS to '1'.
In this state, the state machine of the receiving element can only transfer to the UNSYNCHRONISED state when RESTART_FROM_DISABLE=1.

FRAME_SYNC

Set the LOS to '0'.
Restart the message group counter.
Constantly check the frame synchronization using the K28.7 IDLE byte.
If FRAME_UNSYNC_T consecutive invalid message groups are received, then the state machine transitions to the FRAME_UNSYNCHRONISED state.
If ENABLE_BUS_TRANSCEIVER=0 or SET_RUN TIME MODE=0, then the state machine transitions to the FRAME_DISABLE state.
In the FRAME_SYNC state, a valid message group exists when a K28.5 or K28.7 IDLE byte code is at byte 399 and there are no invalid IDLE codes in bytes 0 to 398 and no 8b10b decoding errors are present.

FRAME_UNSYNC

Set the LOS to '1'.
Restart the message group counter.
If FRAME_SYNC_T consecutive valid message groups are received, then the state machine transitions to the FRAME_SYNCHRONIZED state.
If FRAME_DISABLE_T invalid message groups are received, then the state machine transitions to the FRAME_DISABLE state.
In the FRAME_UNSYNC state, a valid message group exists when a K28.5 or K28.7 IDLE byte code is at byte 399 and there are no invalid IDLE codes in bytes 0 to 398 and no 8b10b decoding errors are present.
If ENABLE_BUS_TRANSCEIVER=0 or SET_RUN_TIME_MODE=0, then the state machine transitions to the FRAME_DISABLE state.

FRAME_DISABLE

Stop all counters.
Set the LOS to '1'.

In summary, the idle bytes inserted into the frames at the physical layer level are to synchronise the line rate of data transmission to the bus rate set up by the system clock. Also, synchronisation algorithms using these idle bytes to perform different types of synchronisation algorithms. For initial synchronisation, before run time mode, the quality of the communication links between the nodes are tested by transmitting message groups that consist purely of idle codes instead of data messages. The receiving elements then check the received idle codes and if all idle codes (i.e. 400 idle bytes in this embodiment) have been received correctly, then that message group is said to be valid. If SYNC_T consecutive valid message groups are received then initial synchronisation has been achieved, For frame synchronisation, the first algorithm is when the bus is in run time mode but the frames are unsynchronised. Data messages and an idle-message now make up the message groups that are transmitted. However, now a message group is considered to be valid when an idle code exists (either K28.5 or K28.7) at the last byte of the message group (i.e. byte 399) and there are no invalid IDLE codes in the remainder of the message group (i.e. bytes 0 to 398) and no 8b10b decoding errors are present in the message group. Frame synchronisation is once FRAME_SYNC_T valid consecutive message groups have been received. Also, once frame synchronisation has been achieved it is important to maintain synchronisation. This is accomplished by using the unique idle byte (K28.7) at the end of each frame, which allows one to calculate the received frame offset.

It should be appreciated that each transmitting or receiving element of each node of the bus can independently assume any of the states described herein.

It should also be appreciated that FIG. 3 shows a plurality of links, i.e. 1 to k. Thus, it should be understood that the present invention is scaleable to adapt to different data rates.

It should be appreciated that the frame structure shown in FIG. 5 is one embodiment of the present invention. In this embodiment is that the special IDLE code 82 is inserted at the end of a frame 70. It should be appreciated that the baseband bus is a multi-mode bus and in conjunction with the layered protocol stack it is intended to support a variety of different air interfaces such as GSM or EDGE. With regards to the IDLE bytes 80, it should be appreciated that the position of the IDLE byte within the message group 74 may vary in different implementations. Furthermore, the special IDLE byte 82 might be implemented at other locations in each frame, for example at the start as opposed to the end of the frame 70: all that is needed is that it is in a predetermined known location. Also, the IDLE codes are 1 byte in length in the described embodiment, however for a different embodiment these IDLE codes could be scaled in length so as to match a different frame format.

It should be appreciated that the implementation of the nodes of the communications bus, shown in FIG. 3, are not necessarily limited to ASIC's and can also be implemented using other logical devices, for example a Field Programmable Gate Array (FPGA) devices.

The invention claimed is:

1. A method of transmitting data at a line rate to a bus operating at a bus rate, the method comprising transmitting the data in a packet format consisting of a plurality of frames each having a plurality of time slots, each time slot having successive message groups, wherein each message group comprises a plurality of data messages containing said data and an idle code containing no said data;
wherein the number of idle codes in each frame is selected so that the bus rate matches the line rate.

2. A method according to claim 1, wherein said data messages are of a fixed length.

3. A method according to claim 1, wherein each said message group contains a control message.

4. A method according to claim 1, wherein the bus rate is derived from an integer multiple of an independently generated reference system clock.

5. A communication bus operable at a bus rate and having at least a first node and a second node that are linked by communication channels for transmitting at said bus rate data generated at a line rate, said first node having a transmitting element and said second node having a receiving element, wherein the transmitting element of said first node is operable to transmit data in a packet format consisting of a plurality of frames each having a plurality of time slots, each time slot having successive message groups, wherein each message group comprises a plurality of data messages containing said data and an idle code containing no said data;
wherein said number of idle codes in each frame is selected so that the bus rate matches the line rate and wherein the receiving element of the second node is arranged to detect said idle codes for synchronization purposes.

6. A communication bus according to claim 5, wherein said communication channels comprise a first set of channels for transferring data in one direction and a second set of channels for transferring data in the opposite direction.

7. A communication bus according to claim 6, wherein said first node comprises a receiving element and said second node comprises a transmitting element, such that the transmitting element of the first node communicates with the receiving element of the second node over said first set of channels and said transmitting element of the second node communicates with the receiving node of the first node over said second set of channels.

8. A communication bus according to claim 5, wherein at least one of said idle codes inserted into the frame is different from the other idle codes in the frame and is used to mark a frame boundary.

9. A method of synchronising a data communication over a bus in a packet format, said data having been generated at a line rate to a bus operating at a bus rate, the method comprising transmitting the data in a packet format consisting of a plurality of frames each having a plurality of time slots, each time slot having successive message groups, wherein each message group comprises a predetermined number of data messages containing said data and an idle code containing no said data, the method comprising detecting at a bus node said idle codes until a predetermined number of said idle codes have been detected indicating successful synchronization.

10. A method according to claim 9, wherein at least one of said idle codes inserted into the frame is a unique idle code, said unique idle code being different from the other idle codes and being used to mark a frame boundary.

11. A method according to claim 9, wherein a check on the quality of the bus is achieved by synchronisation of each node comprising the steps of:
transmitting message groups containing only idle codes so that no data messages are transmitted;
receiving said idle codes so that if all idle codes are received correctly a valid message group is received; and
counting the number of consecutive valid message groups received and, when said number reaches a predetermined value, indicating that synchronisation of said bus node has been achieved.

12. A method according to claim 9, wherein a check on the quality of the bus is achieved by synchronisation of each node comprising the steps of:
transmitting message groups containing only idle codes so that no data messages are transmitted;
receiving said idle codes so that if one or several idle codes are received erroneously an invalid message group is received;
counting the number of consecutive invalid message groups received and, when said number reaches a predetermined value, indicating a failure of synchronisation of the bus link.

13. A method according to claim 9, wherein for data communications that are unsynchronised, the synchronisation of said bus is achieved by performing the following steps:
transmitting said message groups containing data messages and an idle code;
receiving said message groups where a message group is considered valid if an idle code exists at the end of the message group and no idle codes exist in the remainder of said message group;
counting the number of consecutive valid message groups received and, when said number reaches a predetermined value, indicating a synchronised state.

14. A method according to claim 13, wherein a message group is considered valid if an idle code exists at the end of the message group, no idle codes exist in the remainder of said message groups, and there exist no 8b10b decoding errors in the message group.

15. A method according to claim 9, wherein for data communications that are synchronised, an unsynchronised state of said bus is detected by performing the following steps:

transmitting said message groups containing data messages and an idle code;

receiving said message groups where a message group is considered invalid if an idle code does not exist at the end of the message group or an idle code exists in the remainder of said message group or there exists 8b10b decoding errors in the message group;

counting the number of consecutive invalid message groups received and, when said number reaches a predetermined value, indicating an unsynchronised state.

16. A method according to claim 1, when applied to a protocol stack, comprising an application layer, a transport layer and a physical layer, wherein data is transferred across the physical layer using said packet format and wherein said physical layer is able to report the synchronisation status of said bus to said upper transport and application layers.

* * * * *